United States Patent
O'Brien et al.

(10) Patent No.: US 12,497,288 B2
(45) Date of Patent: Dec. 16, 2025

(54) SYSTEM AND METHOD FOR ARRAY OF MEMS ELEMENTS

(71) Applicant: TEXAS INSTRUMENTS INCORPORATED, Dallas, TX (US)

(72) Inventors: Sean Christopher O'Brien, University Park, TX (US); Kelly Jay Taylor, Allen, TX (US); John Wesley Hamlin, III, Dallas, TX (US); Christopher Murray Beard, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 704 days.

(21) Appl. No.: 17/843,816

(22) Filed: Jun. 17, 2022

(65) Prior Publication Data
US 2023/0077129 A1   Mar. 9, 2023

Related U.S. Application Data

(60) Provisional application No. 63/240,650, filed on Sep. 3, 2021.

(51) Int. Cl.
*B81C 1/00* (2006.01)
*G02B 26/06* (2006.01)

(52) U.S. Cl.
CPC .... *B81C 1/00007* (2013.01); *B81B 2201/042* (2013.01); *B81C 2201/0132* (2013.01); *B81C 2201/018* (2013.01); *G02B 26/06* (2013.01)

(58) Field of Classification Search
CPC ........ B81B 2201/042; B81C 2201/018; B81C 2201/0132; B81C 1/00007
USPC ............................................................ 438/50
See application file for complete search history.

(56) References Cited

U.S. PATENT DOCUMENTS

| | | |
|---|---|---|
| 10,928,624 B2 | 2/2021 | Martinez |
| 11,409,098 B2 | 8/2022 | Sherwin et al. |
| 11,703,678 B2 | 7/2023 | Sherwin et al. |
| 11,953,674 B2 | 4/2024 | Martinez |
| 2006/0292851 A1* | 12/2006 | Lin ........................ H01L 24/03 438/618 |

* cited by examiner

*Primary Examiner* — Monica D Harrison
(74) *Attorney, Agent, or Firm* — Michael T. Gabrik; Frank D. Cimino

(57) ABSTRACT

In an example, a method of manufacturing a MEMS device includes forming a via. The method also includes depositing metal in the via and depositing a first layer of a non-photoactive organic polymer on the metal. The method includes baking the first layer of the non-photoactive organic polymer. The method also includes depositing a second layer of the non-photoactive organic polymer on the first layer of the non-photoactive organic polymer after baking the first layer of the non-photoactive organic polymer. The method includes baking the second layer of the non-photoactive organic polymer. The method also includes etching the first layer and the second layer of the non-photoactive organic polymer.

20 Claims, 13 Drawing Sheets

SYSTEM AND METHOD FOR ARRAY OF MEMS ELEMENTS

CROSS-REFERENCE TO RELATED APPLICATIONS

The present application claims priority to U.S. Provisional Patent Application No. 63/240,650, which was filed Sep. 3, 2021, is titled "Array of High Uniformity MEMS Elements," and is hereby incorporated herein by reference in its entirety.

BACKGROUND

Microelectromechanical systems (MEMS) processing is a process technology useful for forming small devices that combine mechanical and electrical components. For many MEMS devices, semiconductor device fabrication technologies may be useful. Some MEMS devices are fabricated by depositing, etching, and/or planarizing layers made of different materials, such as metals, oxides, and photoresist. The properties of the materials used for the different layers necessitate various mechanical and chemical processes to form the final MEMS device.

SUMMARY

In accordance with at least one example of the description, a method of manufacturing a MEMS device includes forming a via. The method also includes depositing metal in the via and depositing a first layer of a non-photoactive organic polymer on the metal. The method includes baking the first layer of the non-photoactive organic polymer. The method also includes depositing a second layer of the non-photoactive organic polymer on the first layer of the non-photoactive organic polymer after baking the first layer of the non-photoactive organic polymer. The method includes baking the second layer of the non-photoactive organic polymer. The method also includes etching the first layer and the second layer of the non-photoactive organic polymer.

In accordance with at least one example of the description, a method includes depositing a spacer material over a substrate. The method also includes patterning the spacer material to form patterned spacer material. The method includes depositing a metal layer over the patterned spacer material. The method includes depositing an oxide film over the metal layer. The method includes etching a portion of the oxide film, where the oxide film remains at a sidewall and a bottom of the patterned spacer material. The method also includes patterning the metal layer with a pattern and etching the pattern into the metal layer. The method includes depositing a first layer of a non-photoactive organic polymer over the metal layer. The method also includes baking the first layer of the non-photoactive organic polymer. The method includes depositing a second layer of the non-photoactive organic polymer over the first layer of the non-photoactive organic polymer. The method also includes baking the second layer of the non-photoactive organic polymer. The method includes etching the non-photoactive organic polymer.

In accordance with at least one example of the description, a method for manufacturing a phase light modulator (PLM) includes forming a via for a hinge of the PLM. The method includes depositing metal in the via to form the hinge. The method includes depositing a first layer of a non-photoactive organic polymer over the hinge. The method also includes baking the first layer of the non-photoactive organic polymer. The method includes depositing a second layer of the non-photoactive organic polymer on the first layer of the non-photoactive organic polymer after baking the first layer of the non-photoactive organic polymer. The method includes baking the second layer of the non-photoactive organic polymer. The method also includes etching the first layer and the second layer of the non-photoactive organic polymer to reveal a portion of the hinge of the PLM.

BRIEF DESCRIPTION OF THE DRAWINGS

The same reference numbers or other reference designators are used in the drawings to designate the same or similar (functionally and/or structurally) features. The drawings may not accurately reflect the size or scale of the features shown in the drawings.

DETAILED DESCRIPTION

Figure 1A:
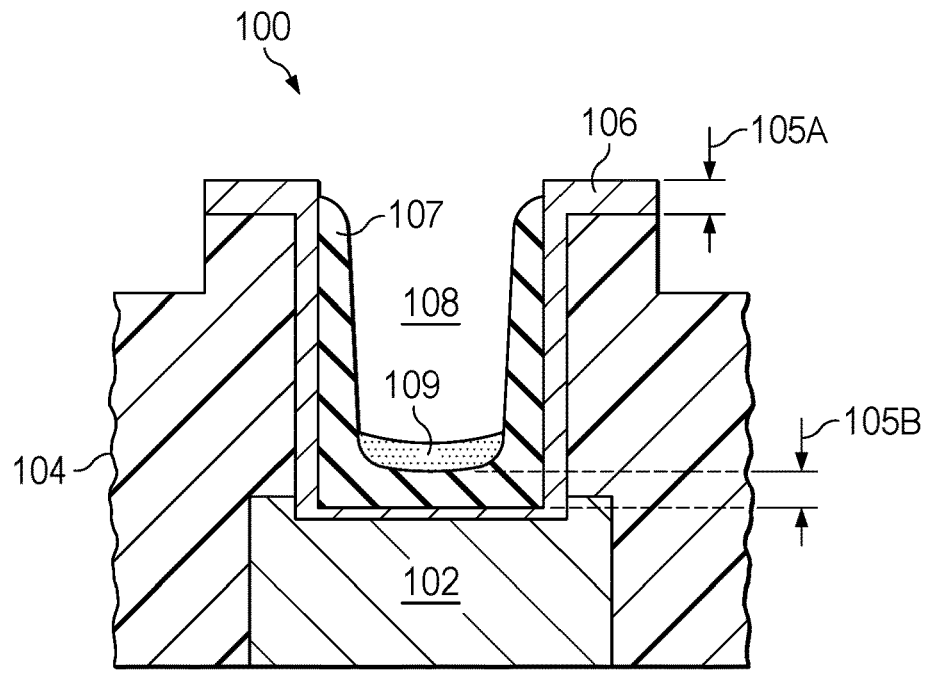
FIGS. 1A-1D show a process flow for creating a flat mirror via in accordance with various examples herein.

MEMS devices may be manufactured and used for a variety of applications, such as accelerometers, microphones, micro-barometers, microsensors, and spatial light modulators (SLM) (e.g., digital micromirror devices (DMDs)). One example MEMS device is a phase light modulator (PLM). A phase light modulator (PLM) has an array of individually-addressable, digitally-controlled micromirrors that may be positioned at multiple discrete vertical positions. The micromirrors may move vertically by fractions of a wavelength of the light directed to the micromirrors. In example systems, specific voltages may be applied to an electrode to cause the micromirrors to move to one of a number of discrete positions, such as 8 or 16 positions. The systems may include a post and hinges that couple to a top plate and extend from a center of the post, with the hinges and the top plate being useful to move the micromirrors to each of the discrete positions. The phase of the light reflected by the micromirrors is modulated by moving the micromirrors up and down amongst the vertical positions. Diffraction of the light causes constructive diffraction patterns that produce bright regions, and destructive diffraction patterns that produce dark regions. These light and dark regions may be used to produce images.

A DMD also includes an array of individually-addressable, digitally-controlled micromirrors. The DMD has on its surface an array of several hundred thousand or millions of microscopic mirrors, often made of aluminum. Each micromirror corresponds to a pixel in an image from light that is projected onto the micromirrors and then reflected from the micromirrors to a display. The micromirrors can be individually rotated (±10°, ±12°, ±14.5°, or ±17° in various examples) to an on or off state. The on or off status of each micromirror is programmed so the image will be reflected onto the display. In the on state, light from a projector bulb is reflected from the micromirror to a lens, making a pixel appear bright on the display. In the off state, the light is reflected elsewhere (away from the lens and onto a heatsink), making the pixel appear dark on the display. Rapidly toggling the micromirror between the on and off states produces grayscales on the display, which are controlled by the ratio of on-time to off-time. Also, colored light is projected towards the micromirrors to produce color images.

PLMs may be used for visible wavelength applications such as static or dynamic images, high dynamic range (HDR) video, virtual displays, augmented reality displays, LIDAR, and automobile headlights. In ultraviolet portions of the spectrum, PLMs may be used for lithography or three-dimensional (3D) printing. In infrared portions of the spectrum, PLMs may be used for telecommunications or ranging applications.

Poor uniformity of MEMS elements, such as the mirrors on a PLM or a DMD, may limit the optical performance of the PLM or DMD. Uniformity of the mirrors of a PLM or DMD may be described with various metrics, such as the tilt angle of the mirrors, the height of the mirror compared to other mirrors, or the shape of the mirrors. The optical performance of the PLM or DMD may be limited by poor efficiency, low contrast, or ghost images in some examples due to poor uniformity. Ghost images are secondary, unwanted images produced by a PLM due to higher-order diffraction patterns. The uniformity may be measured for a single mirror, from mirror to mirror, across an array of mirrors, across a wafer, from wafer to wafer, or from lot to lot. Uniformity may be measured using the mean, variance, standard deviation, root mean square (RMS), or tail of the distribution in some examples.

A mirror via for a PLM may be filled with a gap-filling substance and baked. A mirror via may be a support post for a mirror, and the via may electrically or mechanically connect one layer to another. The vias may be made by forming an opening through an intermediate layer, such as by patterned holes or trenches. The gap-filling substance in the mirror via may have a divot on its top surface above the filled via due to incomplete filling and planarization. Photoresist is used to fill the divot and then etched away with a plasma etch. A plasma etch involves removing material from a surface by pulsing a plasma gas mixture at the surface. However, in these techniques, a dome shape is formed by the gap-filling substance in the via due to the uneven etch rates of the photoresist and the gap-filling substance.

In examples herein, processing techniques are described that produce flatter, more uniform mirrors. A gap-filling substance is used to fill a via and planarize the patterned hinge level and is then baked. Rather than using a photoresist to fill the divot, as described above, a second layer of the gap-filling substance is deposited and baked. Then, an etch is performed on the gap-filling substance. Because the same gap-filling substance is used for both the first and the second layers, the gap-filling substance etches uniformly and creates a flat top surface. With the flat top surface, structures created on top of the gap-filling surface, such as a mirror of a PLM, may be made flatter compared to other techniques. In some examples herein, the gap-filling substance is a non-photoactive organic polymer. In one example, organic polymers are macromolecules composed of many repeating monomer units that contain carbon atoms in the backbone.

The examples herein describe a process to create a PLM with a flatter mirror than existing processes. However, the processes described herein are useful for creating any type of MEMS device, including SLMs, DMDs, accelerometers, microphones, micro-barometers, or microsensors. The examples herein may be used for creating contact MEMS devices and non-contact MEMS devices. For devices other than PLMs, such as DMDs, the examples herein use the gap-filling substance in place of a photoresist to fill vias or other gaps. Then, as described herein, flat surfaces may be created by etching the layers of the gap-filling substance uniformly. For example, if a mirror of a DMD is deposited on the flat surface, the mirror may be flatter compared to other techniques.

FIGS. 1A-1D show a process flow for forming a flat mirror via in accordance with various examples herein. Some steps are omitted for simplicity. In FIGS. 1A-1D, the drawings may not accurately reflect the size or scale of the features shown in the drawings. In FIG. 1A, structure 100 has been created by depositing, patterning, and etching various layers of materials to create a via 108. Structure 100 includes metal layers 102, sacrificial spacer via layer 104, structural hinge metal 106, oxide 107, via 108, and bottom anti-reflective coating (BARC) layer 109. In some examples, the thickness 105A of structural hinge metal 106 may be 100-1000 Angstroms. To provide more structural integrity, oxide 107 may be deposited onto structural hinge metal 106. Oxide 107 may have a thickness 105B of approximately 3000 Angstroms in some examples. Oxide 107 reinforces the hinge vias and provides support for the mirrors of the PLM. Oxide 107 may be deposited through plasma-enhanced chemical vapor deposition (PECVD) in one example after the deposition of structural hinge metal 106. Then, BARC layer 109 may be deposited to protect the oxide 107. Oxide 107 is then removed from the top of the structural hinge metal 106. In some examples, oxide 107 remains only at the bottom and sidewall of via 108. FIG. 1A shows the remaining oxide 107 and BARC layer 109 after these steps are performed. The oxide etch may be a fluorine-based plasma. The fluorine-based plasma is highly selective to oxide 107 over structural hinge metal 106, so little to none of the structural hinge metal 106 is removed in one example.

Metal layers 102 may include metals, metal alloys, a substrate, or a components of an anti-reflective coating (ARC) film stack. These layers have been deposited, patterned, and etched to form the structure shown here. In some examples, metal layers may include titanium oxide, titanium nitride, and/or aluminum. Metal layers 102 may be a complementary metal-oxide semiconductor (CMOS) substrate, which may sit on a substrate of intermetal dielectric (IMD) oxide (not shown in FIG. 1A). Metal layers 102 may be built on top of a multi-layer transistor layout that includes traditional semiconductor source/drains, polysilicon gates, contacts, poly-metal dielectric, and multiple levels of interconnect metal isolated with inter-metallic dielectrics (not shown in FIG. 1A). This transistor layout provides signals for controlling the operation of the PLM. Sacrificial spacer via layer 104 may be any suitable sacrificial material that is removed during a later processing step to release the MEMS device. Sacrificial spacer via layer 104 may be patterned and/or etched to produce the shape shown in FIG. 1A. Sacrificial spacer via layer 104 may be a photoresist or carbon rich film in some examples. The material for structural hinge metal 106 may be deposited on portions of sacrificial spacer via layer 104.

Figure 1B:
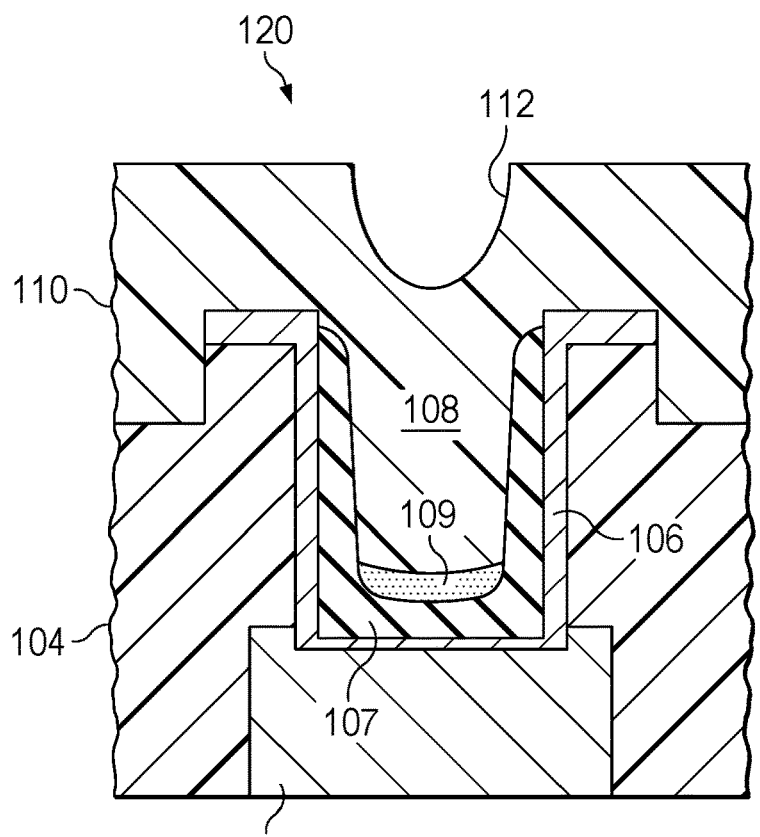

FIG. 1B is a structure 120 where a non-photoactive organic polymer 110 is deposited onto structure 100 of FIG. 1A. Non-photoactive organic polymer 110 may be a spin-on carbon (SOC), which is a type of organic spin-coated polymer. Non-photoactive organic polymer 110 may be a methacrylate polymer in some examples. Non-photoactive organic polymer 110 may be deposited on sacrificial spacer via layer 104 and via 108 as shown. Via 108 is therefore a filled via that is filled with non-photoactive organic polymer 110. Other organic spin-coated polymers may be used in some examples.

In an example, the non-photoactive organic polymer 110 is deposited and spun for a certain target thickness. The non-photoactive organic polymer 110 is then baked to cure it. In one example, the non-photoactive organic polymer 110 is baked at 180-220° Celsius (C.). In one example, the non-photoactive organic polymer 110 is baked at 175-185° C. The non-photoactive organic polymer 110 may become rigid after baking. As seen in FIG. 1B, due to the deposition and baking process, the non-photoactive organic polymer 110 may have a divot 112 after it has cured. The divot 112 is not to scale, but is enlarged for clarity. If a mirror, such as a mirror for a PLM, were created above divot 112, the mirror may not be flat. Therefore, the subsequent steps described below are performed to attempt to flatten the divot.

Figure 1C:
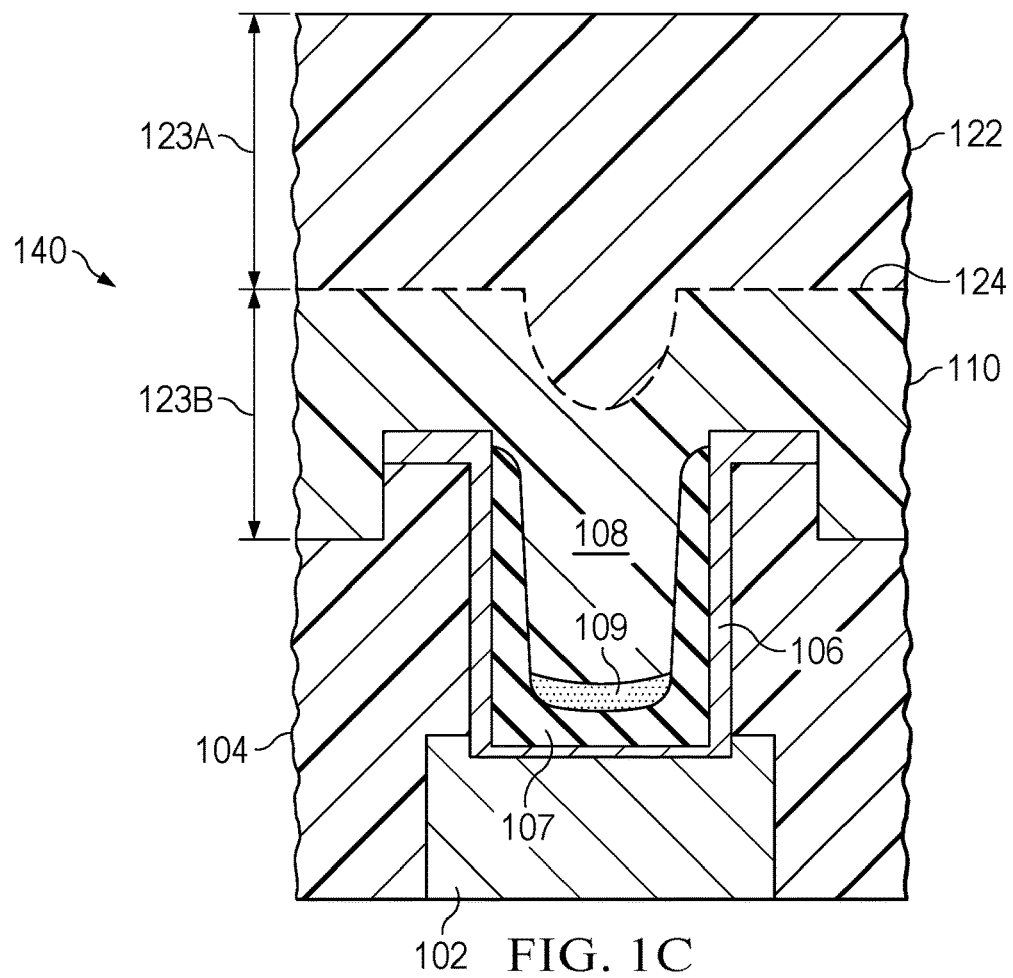

In examples herein, a second layer of non-photoactive organic polymer 110 is deposited. FIG. 1C is a structure 140 that has a second layer 122 of the non-photoactive organic polymer deposited on non-photoactive organic polymer 110. In one example the second layer 122 may have a thickness 123A between 1,000 and 10,000 Angstroms. A dashed line 124 shows an approximate boundary between the first layer of non-photoactive organic polymer 110 and the second layer 122. After the first layer of non-photoactive organic polymer 110 is baked and cross linked, the second layer 122 may be deposited. The second layer 122 fills divot 112, and has a flat upper surface. After second layer 122 is deposited, structure 140 is baked and cross linked to harden second layer 122. Structure 140 may be baked at 180-220° C. in one example. In some examples, second layer 122 has a thickness 123A that is thicker than the thickness 123B of non-photoactive organic polymer 110. If a divot occurs at the top of second layer 122, it may be a small divot that does not substantially affect the flatness of the mirror.

Figure 1D:
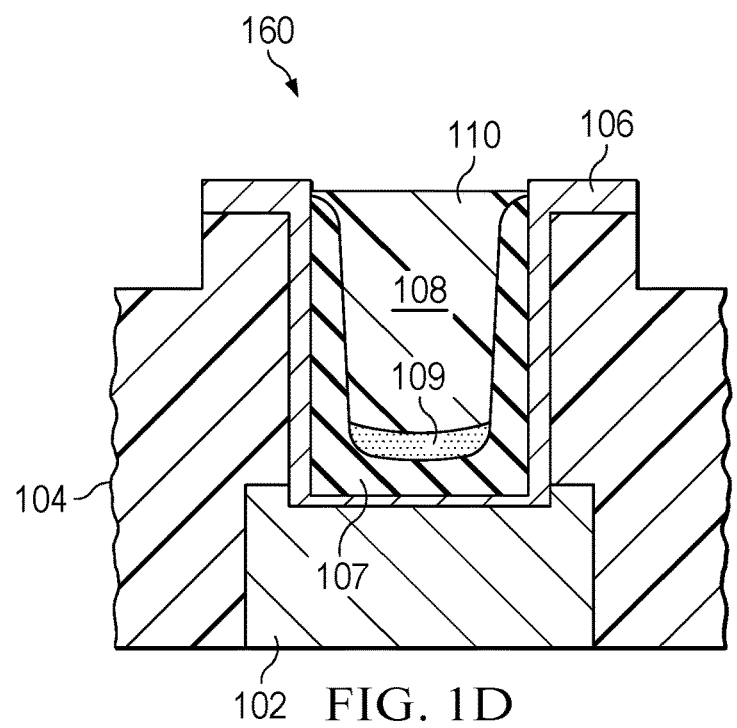

FIG. 1D shows structure 160, which is the resulting structure after second layer 122 and non-photoactive organic polymer 110 have been etched from structure 140. In this example, second layer 122 and non-photoactive organic polymer 110 etch at the same rate because they are the same material. Therefore, no dome structure is present after etching such as the photoresist example described above. Rather, the top surface of non-photoactive organic polymer 110 in via 108 is flat. Therefore, flat structures may be created on top of non-photoactive organic polymer 110 in subsequent processing steps. In an example, a mirror for a PLM may be created using structure 160, and the mirror will be flatter than conventional solutions.

In some examples, the non-photoactive organic polymer 110 is deposited using two layers rather than one layer due to the properties of the material. The deposition techniques may not allow the organic polymer to be deposited to the appropriate thickness with just one layer. In another example, the baking and curing process may not provide appropriate results if one thick layer is used rather than two layers. In another example, the etch process may provide better results with two layers rather than one thick layer.

Figure 2A:
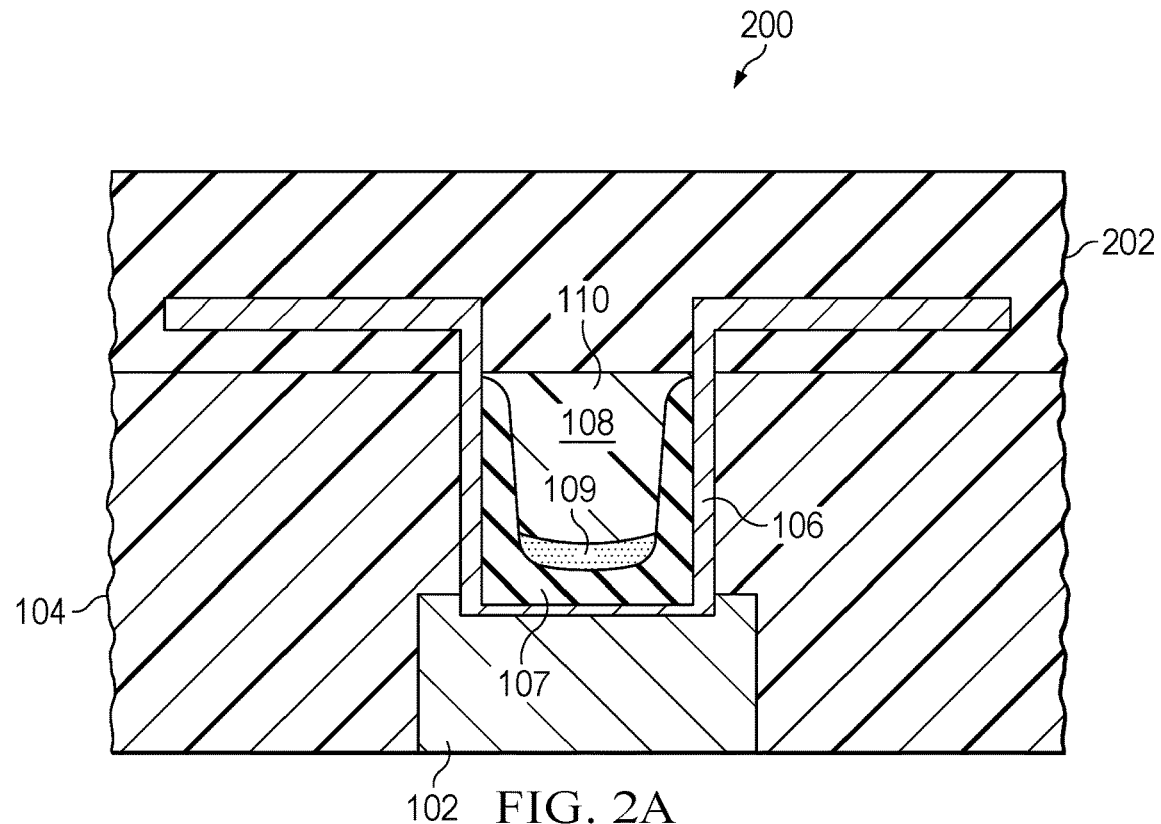
FIGS. 2A-2D show a process flow for creating a mirror of a phase light modulator (PLM) in accordance with various examples herein.

FIGS. 2A-2D show an example method of producing a mirror structure 200 for a PLM in accordance with various examples herein. The components in structure 200 are not shown to scale. In FIG. 2A, structure 200 is formed using the technique described above with respect to FIGS. 1A-1D and therefore has a flat mirror. Structure 200 shows a larger view of a mirror of a PLM than shown in FIG. 1D. Structure 200 includes metal layers 102, sacrificial spacer via layer 104, structural hinge metal 106, oxide 107, via 108, BARC layer 109, and non-photoactive organic polymer 110. In this example, non-photoactive organic polymer 110 was deposited and processed in two layers as described above with respect to FIGS. 1A-1D, and therefore has a flat top surface. Structure 200 also includes sacrificial spacer via layer 202. Sacrificial spacer via layer 202 is deposited onto structural hinge metal 106 and non-photoactive organic polymer 110 as shown in FIG. 2A.

Figure 2B:
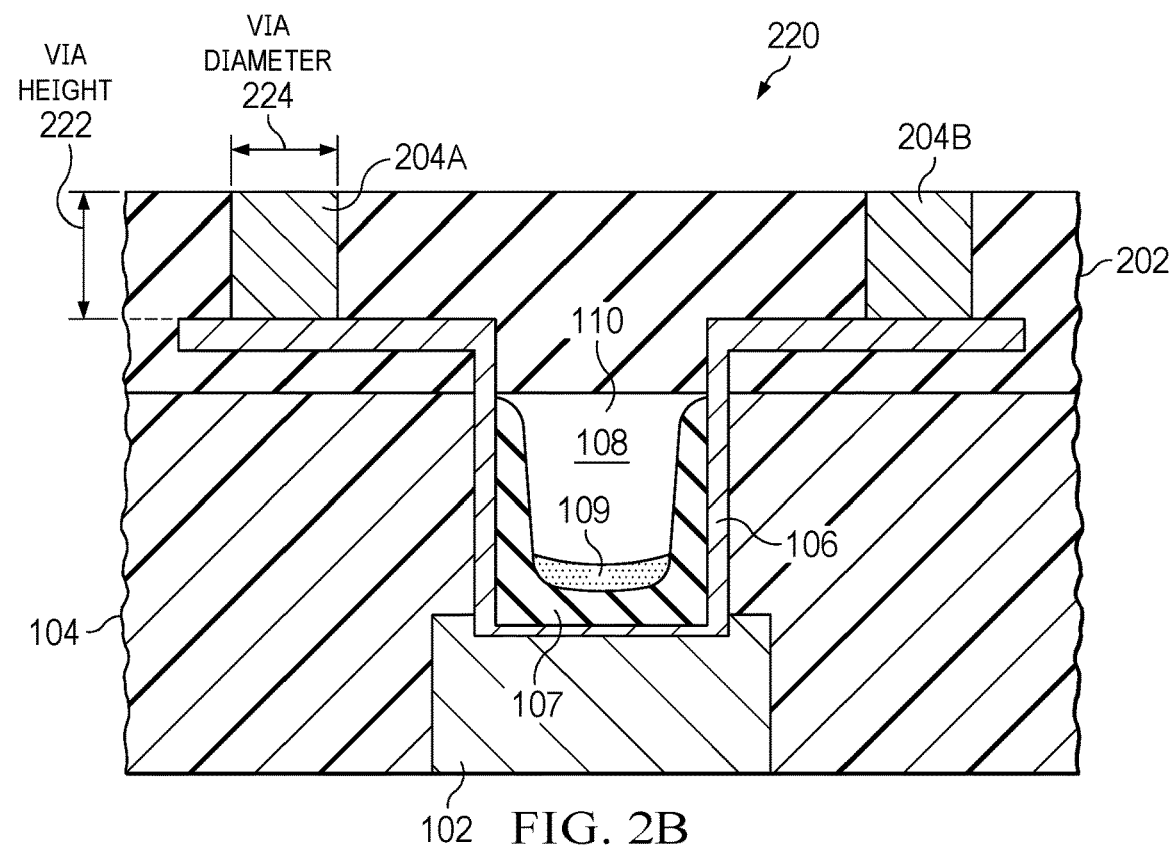

FIG. 2B shows structure 220, where mirror vias 204A and 204B have been created in sacrificial spacer via layer 202. Sacrificial spacer via layer 202 is patterned and etched to create mirror vias 204A and 204B. Mirror vias 204A and 204B are the structural connection from structural hinge metal 106 to a mirror of the PLM, shown below in FIG. 2C. The material for mirror vias 204A and 204B may be deposited onto structural hinge metal 106 using any suitable method. The material for mirror vias 204A and 204B may be an organic polymer in some examples, a BARC material, a gap-filling material, or any other suitable material. Mirror vias 204A and 204B may be between 0.3 and 6.0 micrometers deep (e.g., height 222), and may also have a diameter between 0.3 and 6.0 micrometers, for example approximately 1.0 micrometers in some examples. Via height 222 (e.g., mirror via depth) and via diameter 224 are shown in FIG. 2B. Mirror vias 204 may be deep filled mirror vias in an example, and may be partially or completely filled.

Figure 2C:
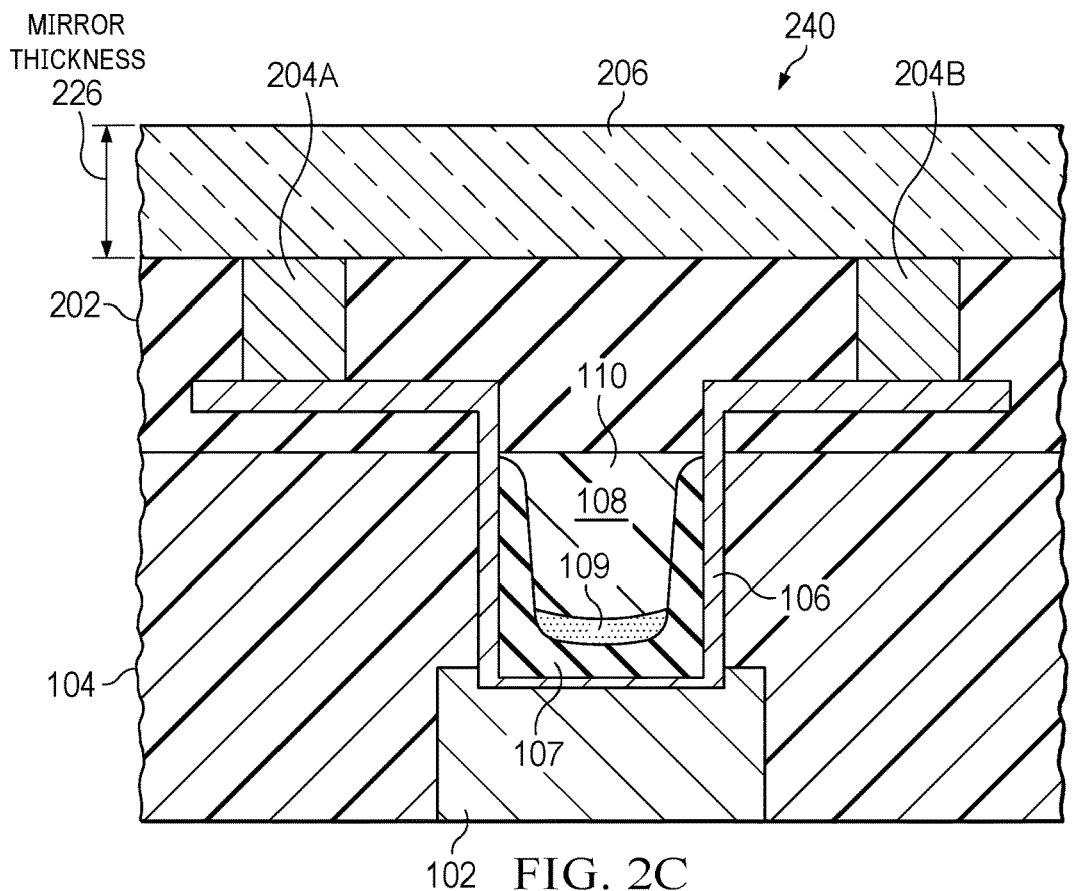

FIG. 2C shows structure 240, which includes mirror 206. After mirror vias 204A and 204B are created, mirror material (such as a metal) for mirror 206 is deposited on sacrificial spacer via layer 202 and mirror vias 204A and 204B. Mirror 206 may be a metal such as aluminum in one example. Mirror 206 may have a thickness 226 between 500 and 5000 Angstroms, for example approximately 2400 Angstroms. As shown in FIG. 2C, mirror 206 has a flat supper surface because sacrificial spacer via layer 202 has a flat upper surface. Sacrificial spacer via layer 202 has a flat upper surface because there is no dome or divot in non-photoactive organic polymer 110, due to non-photoactive organic polymer 110 being created using the example techniques described herein.

Figure 2D:
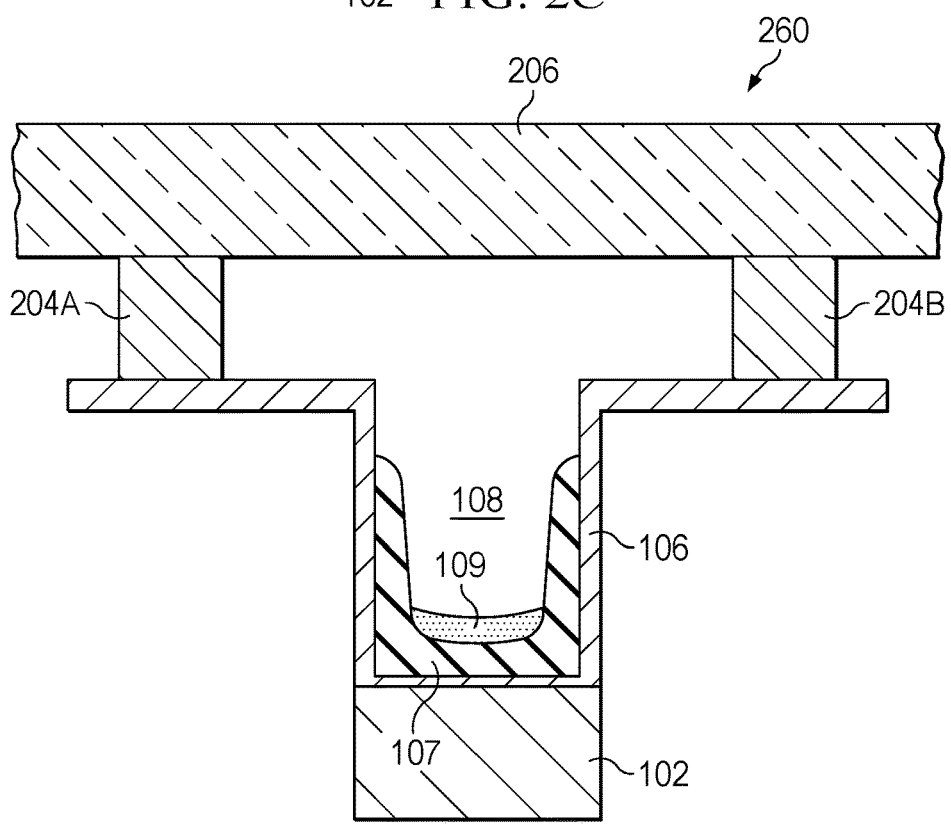

FIG. 2D is a structure 260 for a mirror of a PLM in accordance with various examples herein. Structure 260 shows structure 240 from FIG. 2C after the sacrificial planarization materials and spacer materials have been removed, such as sacrificial spacer via layer 104, non-photoactive organic polymer 110, and sacrificial spacer via layer 202. Removing these materials releases the final MEMS device. In this example, structure 260 is a mirror of a PLM, and releasing the device allows the structural hinge metal 106 and mirror 206 to move freely during device operation. Sacrificial materials and spacer materials may be removed using any suitable techniques, such as ashing, dry etching, or wet etching. After removal of the sacrificial materials, the mirror may move vertically. After removal of the sacrificial materials, a corner of the mirror may tilt away from the plane of the MEMS structure in some examples.

Mirror 206 has a flat upper surface as described herein. Also, if an array of mirrors 206 is created, the mirrors may exhibit good uniformity. The uniformity may be measured using the metrics described below. For a PLM, each individual mirror may move vertically to a height which is unrelated to the heights of other mirrors. For a DMD, each individual mirror may tilt to an angle which is unrelated to any other mirrors. Good uniformity improves the optical performance of a device such as a PLM or DMD. Optical performance includes efficiency, contrast, or the reduction of ghost images in some examples.

Uniformity may be defined using a number of different metrics. For example, the tilt angle of a single mirror may be measured to determine if it is within an acceptable range. The tilt angles, heights, or root mean square (RMS) of heights may be measured across a collection of mirrors. The mean, standard deviation, variance, or tail of the distribution for these measurements may be calculated. The collection of mirrors may be measured with an interferometer. Measurements may be taken for the mirrors in the field of view of the interferometer, and an array RMS may be determined. The array RMS may be used to calculate a metric that indicates uniformity. In one example, a field of view of 200 micrometers by 200 micrometers for the interferometer may exhibit a total RMS non-uniformity of less than 75 Angstroms. Other metrics may be determined across an array of mirrors, across a wafer of mirrors, from wafer to wafer, or from a lot of wafers to another lot of wafers. Uniformity may also be determined for MEMS elements in a flat state or an actuated state.

Figure 3:
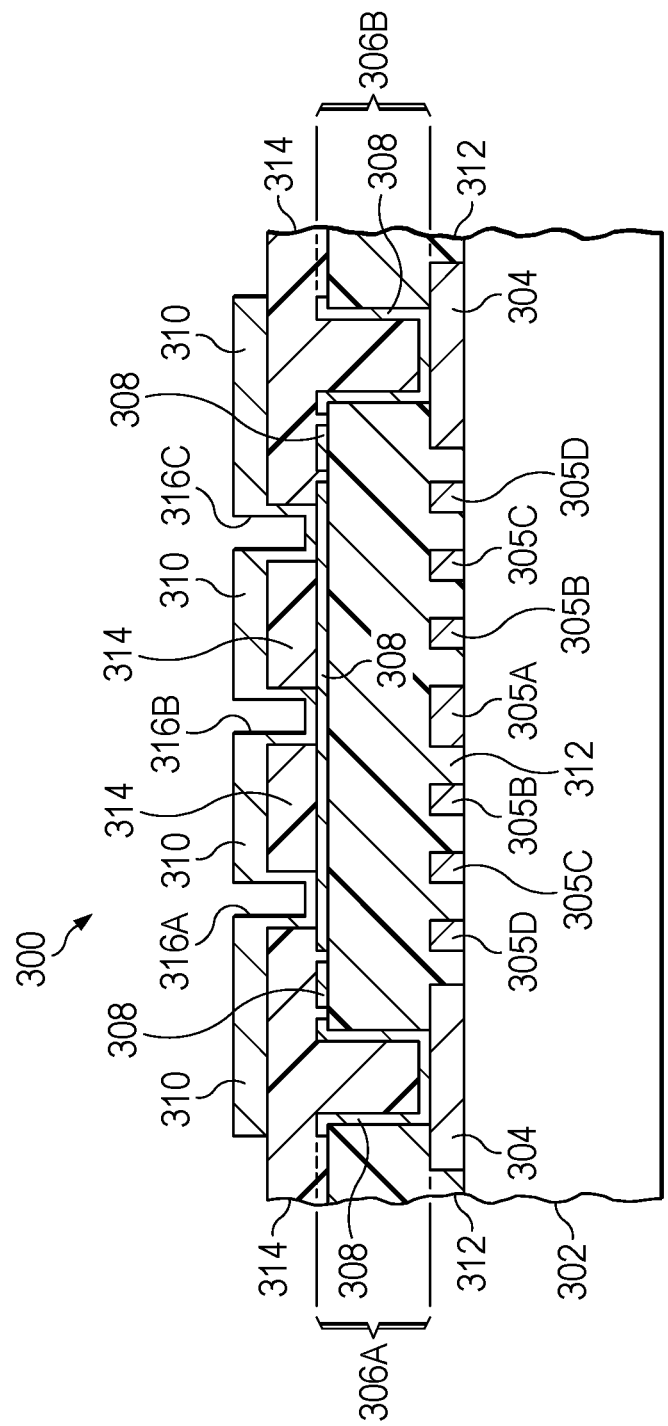
FIG. 3 is a view of a process cross-section for a structure for a PLM in accordance with various examples herein.

FIG. 3 is another view of a process cross-section for a structure 300 for a PLM in accordance with various examples herein. Structure 300 includes base 302, bias electrode 304, electrodes 305A-305D (collectively, electrodes 305), support posts 306A and 306B (collectively, support posts 306), hinge layer 308, mirror plate 310, spacer 1 312, spacer 2 314, and mirror via posts 316A, 316B, and 316C. (collectively, mirror via posts 316). Base 302 is a CMOS static random access memory (SRAM) memory array in one example. Electrodes 305A, 305B, 305C, and 305D are metal layers that include four electrodes to provide 4-bit addressing in this example. The size of and the gaps between electrodes 305 in this cross-section view are not necessarily to scale. A different number of electrodes 305 may be present in other examples. The memory cells in base 302 activate any combination of the four electrodes 305 to vertically move mirror plate 310 to the proper position during operation. In this cross-section, support posts 306A and 306B are shown, but the 4-bit electrode may have four support posts in some examples.

Spacer 1 312 and spacer 2 314 are removed at the end of the manufacturing process for the 4-bit electrode. Spacer 1 312 and spacer 2 314 may be removed using one or more dry or wet etching steps in one example. In one example, a liquid solution dissolves the material of spacer 1 312 and spacer 2 314, leaving the remaining structures in place. Spacer 1 312 is patterned to provide the shape for support posts 306 and hinge layer 308. Mirror plate 310 is formed on spacer 2 314, and spacer 2 314 is patterned to include openings for the mirror via posts 316A, 316B, and 316C. Three mirror via posts 316 are visible in this cross-section, but the number of mirror via posts may vary in some examples as described below. Some examples may have one, four, or five mirror via posts 316.

Figure 4:
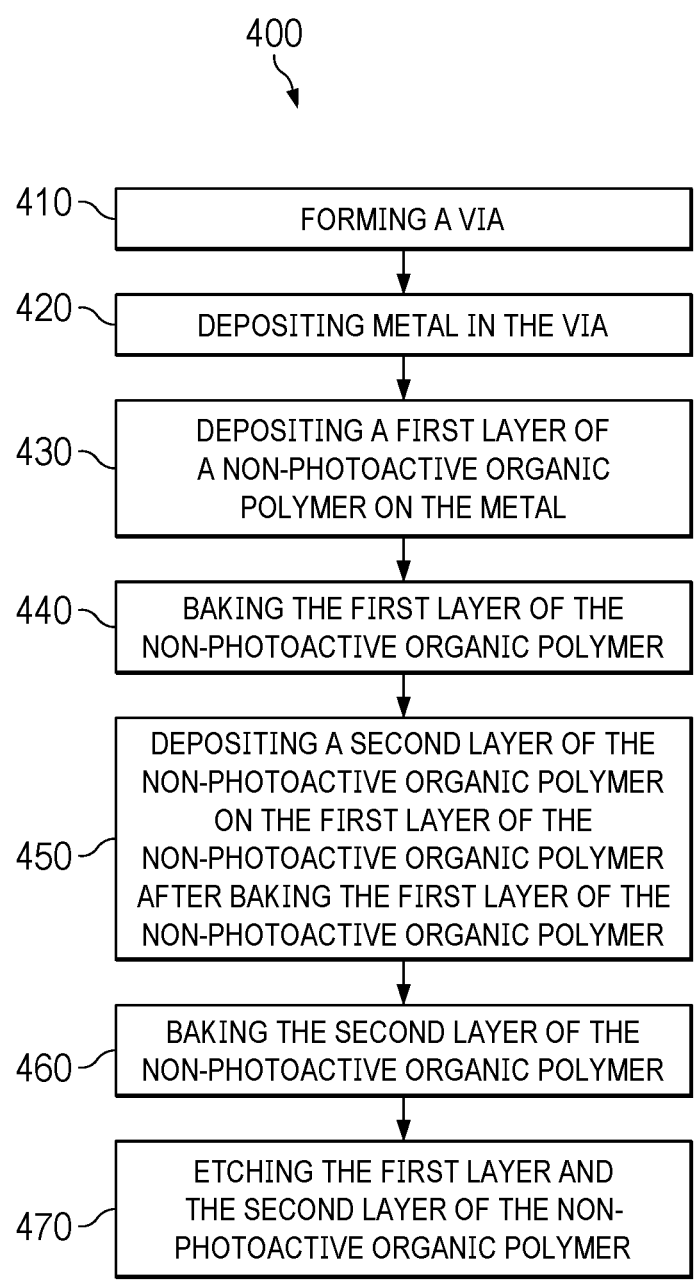
FIG. 4 is a flow diagram of a method for forming a MEMS device with a non-photoactive organic polymer in accordance with various examples herein.

FIG. 4 is a flow diagram of a method 400 for forming a MEMS device with a non-photoactive organic polymer in accordance with various examples herein. The steps of method 400 may be performed in any suitable order.

Method 400 begins at 410, where a via is formed for a MEMS device. In one example, the via is formed in sacrificial spacer via layer 104 as shown in FIG. 1A. Method 400 continues at 420, where a metal for structural hinge metal 106 is deposited in the via 108. The structural hinge metal 106 in the via 108 may form a portion of a hinge for the MEMS device in one example.

Method 400 continues at 430, where a first layer of a non-photoactive organic polymer is deposited on the metal in via 108. The non-photoactive organic polymer may be deposited using any suitable technique. As shown in FIG. 1B, non-photoactive organic polymer 110 is the first layer. The first layer of the non-photoactive organic polymer 110 may have a divot 112 as shown.

Method 400 continues at 440, where the first layer of non-photoactive organic polymer is baked. The first layer may be baked at approximately 180° C. in one example. Baking the non-photoactive organic polymer 110 cures and hardens the polymer. The non-photoactive organic polymer may be cured with a high-uniformity ultraviolet cure in one example.

Method 400 continues at 450, where a second layer of a non-photoactive organic polymer is deposited on the first layer of the non-photoactive organic polymer 110 after baking the first layer of the non-photoactive organic polymer. The second layer of the non-photoactive organic polymer may be deposited using any suitable technique. As shown in FIG. 1C, second layer 122 is deposited on the first layer of the non-photoactive organic polymer 110.

Method 400 continues at 460, where the second layer 122 of non-photoactive organic polymer is baked. The second layer may also be baked at approximately 180° C. in one example. Baking the second layer 122 of the non-photoactive organic polymer cures and hardens the second layer.

Method 400 continues at 470, where the first layer of the non-photoactive organic polymer 110 and the second layer 122 of the non-photoactive organic polymer are etched. In one example, after etching the structure that results is structure 160 as shown in FIG. 1D. After structure 160 is created, additional processing steps may be performed to finish the manufacturing of the MEMS device, such as a PLM or a SLM. One example of additional processing steps is described above with respect to FIGS. 2A-2D.

Figure 5:
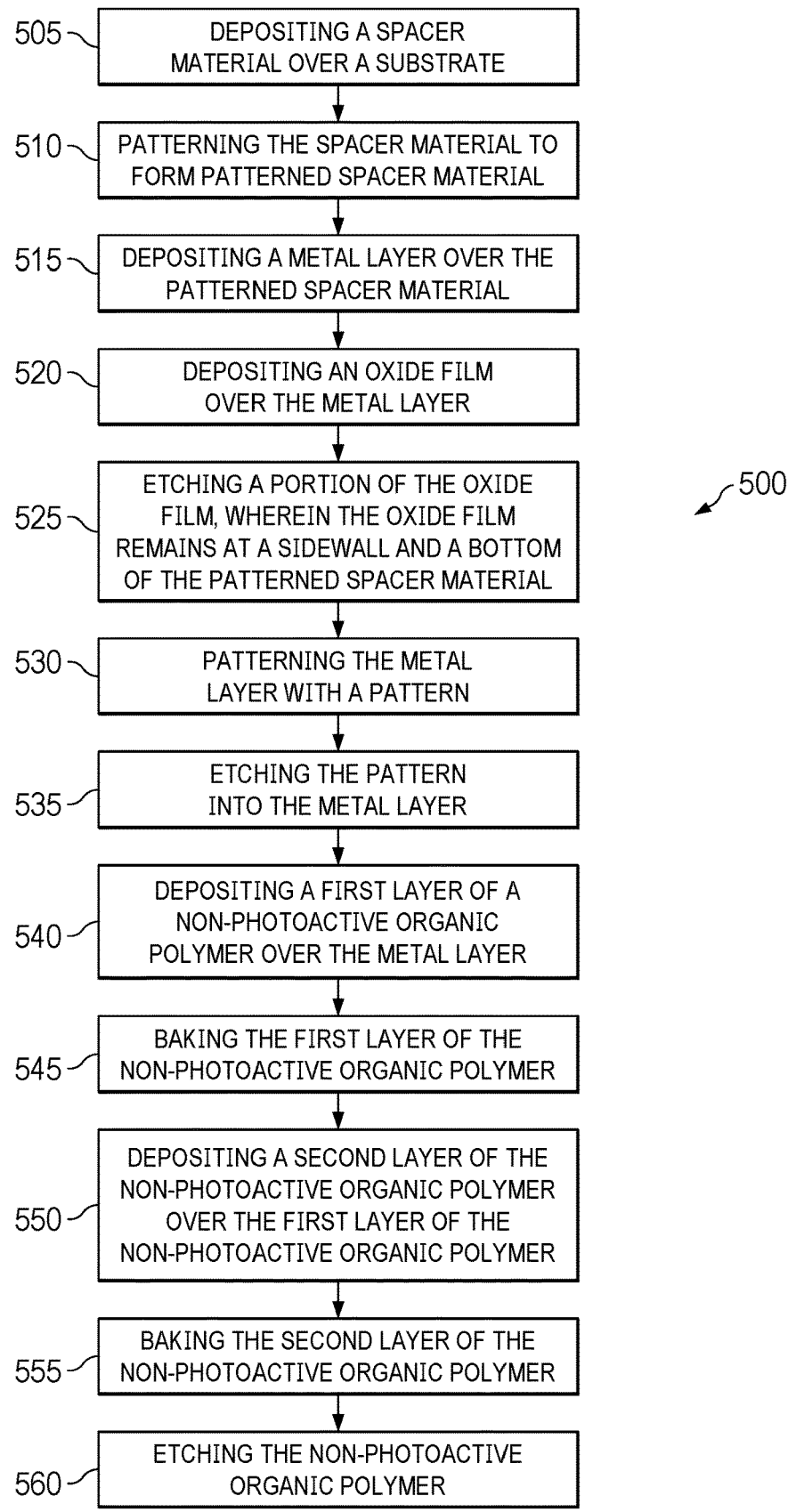
FIG. 5 is a flow diagram of a method for forming a MEMS device with a non-photoactive organic polymer in accordance with various examples herein.

FIG. 5 is a flow diagram of a method 500 for forming a MEMS device with a non-photoactive organic polymer in accordance with various examples herein. The steps of method 500 may be performed in any suitable order.

Method 500 begins at 505, where a spacer material is deposited over a substrate. The spacer material may be material such as sacrificial spacer via layer 104. Method 500 continues at 510, where the spacer material is patterned. The spacer material may be patterned to produce a component of a MEMS device. In one example, the spacer material may be patterned to form a via. In other examples, other components may be formed, such as support posts.

Method 500 continues at 515, where a metal layer is deposited over the spacer material. The metal layer may be between 100 and 1000 Angstroms thick, for example approximately 500 Angstroms thick. In one example, the metal layer forms a hinge structure for an SLM. In another example, a different structure may be formed other than a hinge.

Method 500 continues at 520, where an oxide film is deposited over the metal layer and the spacer material. The oxide film may be between 1000 and 10,000 Angstroms thick in an example. Method 500 continues at 525 where a portion of the oxide film is etched such that the oxide film remains only at a sidewall and a bottom of the patterned spacer material, which may be a via in one example.

Method 500 continues at 530, where the metal layer is patterned with a pattern. Method 500 continues at 535, where the pattern is etched into the metal layer. The metal layer may be patterned and etched using any suitable techniques. The pattern may form the metal layer into an appropriate feature for the MEMS device, such as a hinge for an SLM.

Method 500 continues at 540, where a first layer of a non-photoactive organic polymer is deposited over the patterned spacer material and the patterned metal layer, and/or on or over any other materials. The patterned spacer material may form a hinge via as described above. The non-photoactive organic polymer may be deposited using any suitable technique. As shown in FIG. 1B, non-photoactive organic polymer 110 is the first layer. The first layer of the non-photoactive organic polymer 110 may have a divot 112 as shown.

Method 500 continues at 545, where the first layer of non-photoactive organic polymer is baked. The first layer may be baked at approximately 180° C. in one example. Baking the non-photoactive organic polymer 110 cures and hardens the polymer.

Method 500 continues at 550, where a second layer of a non-photoactive organic polymer is deposited on the first layer of the non-photoactive organic polymer 110. The second layer of the non-photoactive organic polymer may be deposited using any suitable technique. As shown in the example of FIG. 1C, second layer 122 is deposited on the first layer of the non-photoactive organic polymer 110.

Method 500 continues at 555, where the second layer 122 of non-photoactive organic polymer is baked. The second layer may also be baked at approximately 180° C. in one example. Baking the second layer 122 of the non-photoactive organic polymer cures and hardens the second layer.

Method 500 continues at 560, where the first layer of the non-photoactive organic polymer 110 and the second layer 122 of the non-photoactive organic polymer are etched. In one example, after etching the structure that results is structure 160 as shown in FIG. 1D. After structure 160 is created, additional processing steps may be performed to finish the manufacturing of the MEMS device, such as a PLM or a SLM. In other examples, other structures of MEMS devices may be created, including components of contact or non-contact MEMS devices.

Figure 6:
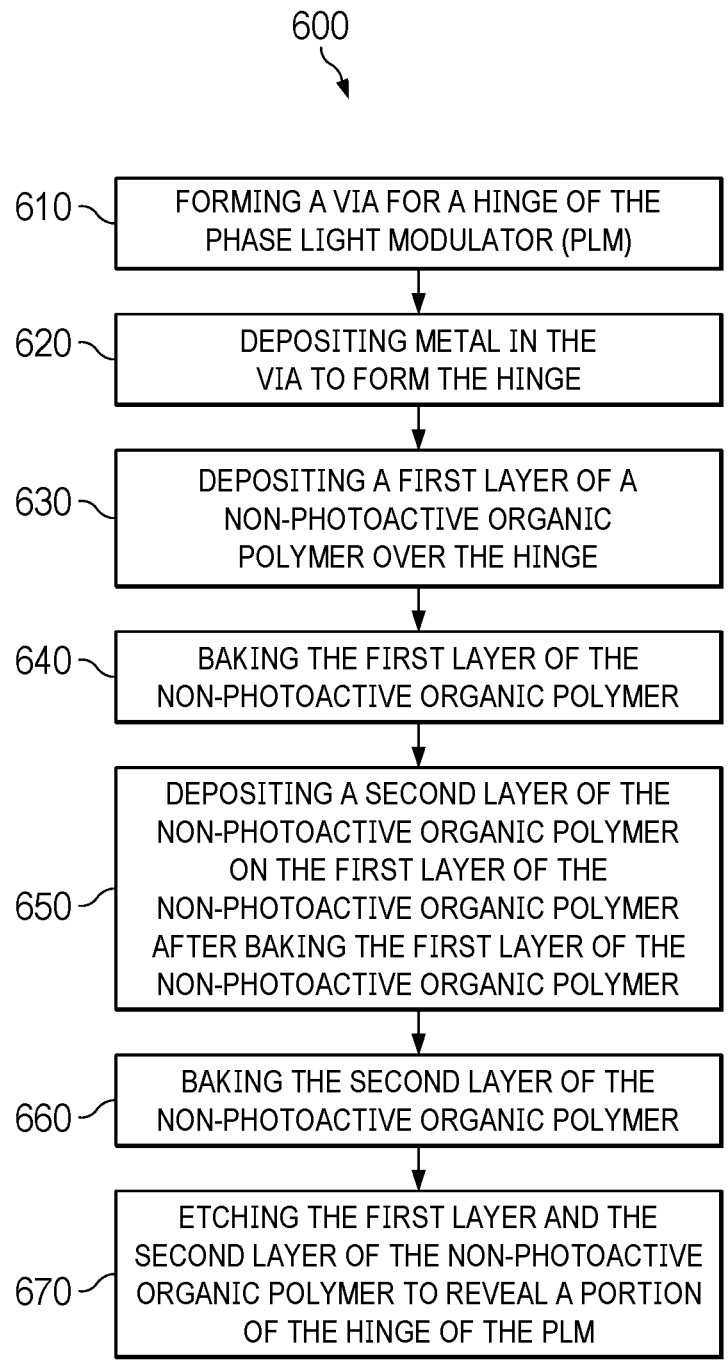
FIG. 6 is a flow diagram of a method for forming a phase light modulator with a non-photoactive organic polymer in accordance with various examples herein.

FIG. 6 is a flow diagram of a method 400 for forming a PLM with a non-photoactive organic polymer in accordance with various examples herein. The steps of method 600 may be performed in any suitable order.

Method 600 begins at 610, where a via is formed for a hinge of a PLM. In one example, the via is formed in sacrificial spacer via layer 104 as shown in FIG. 1A. Method 600 continues at 620, where the method deposits a metal in the via 108 to form the structural hinge metal 106. The structural hinge metal 106 in the via 108 may form a portion of a hinge for the PLM in this example.

Method 600 continues at 630, where a first layer of a non-photoactive organic polymer is deposited over the hinge metal in via 108. The non-photoactive organic polymer may be deposited using any suitable technique. As shown in FIG. 1B, non-photoactive organic polymer 110 is the first layer. The first layer of the non-photoactive organic polymer 110 may have a divot 112 as shown.

Method 600 continues at 640, where the first layer of non-photoactive organic polymer is baked. The first layer may be baked at approximately 180° C. in one example. Baking the non-photoactive organic polymer 110 cures and hardens the polymer. Also, the non-photoactive organic polymer may be cured with a high-uniformity ultraviolet cure in some examples.

Method 600 continues at 650, where a second layer of a non-photoactive organic polymer is deposited on the first layer of the non-photoactive organic polymer 110 after baking the first layer of the non-photoactive organic polymer. The second layer of the non-photoactive organic polymer may be deposited using any suitable technique. As shown in FIG. 1C, second layer 122 is deposited on the first layer of the non-photoactive organic polymer 110.

Method 600 continues at 660, where the second layer 122 of non-photoactive organic polymer is baked. The second layer may also be baked at approximately 180° C. in one example. Baking the second layer 122 of the non-photoactive organic polymer cures and hardens the second layer.

Method 600 continues at 670, where the first layer of the non-photoactive organic polymer 110 and the second layer 122 of the non-photoactive organic polymer are etched to reveal a portion of the hinge of the PLM. In one example, after etching the structure that results is structure 160 as shown in FIG. 1D. After structure 160 is created, additional processing steps may be performed to finish the manufacturing of the PLM. One example of additional processing steps is described above with respect to FIGS. 2A-2D, which include depositing a mirror for the PLM and then releasing the PLM by removing the non-photoactive organic polymer and other spacer layers.

Figure 7A:
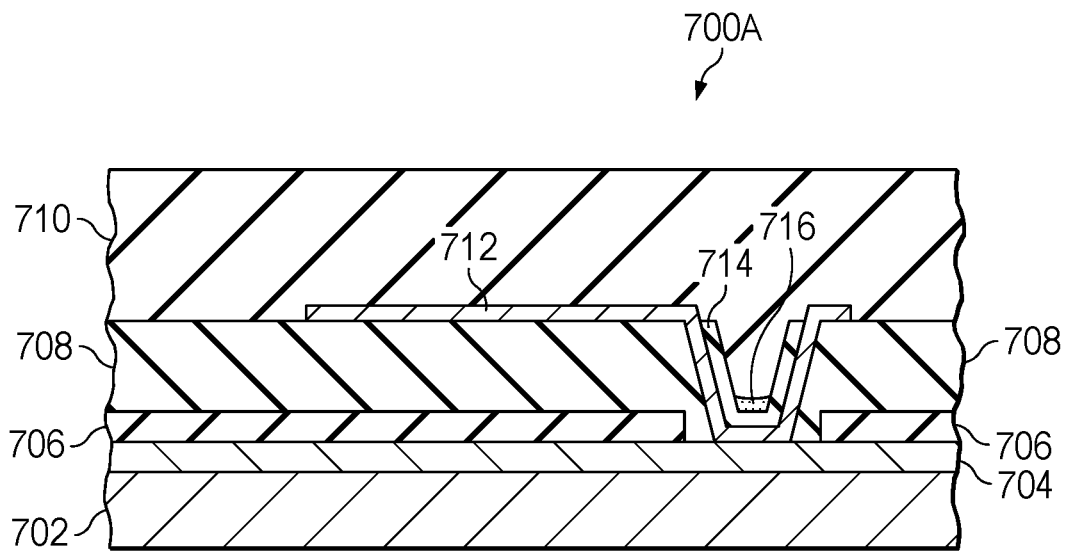
FIGS. 7A-7I show a process flow for creating a mirror of a digital micromirror device (DMD) in accordance with various examples herein.

FIGS. 7A-7I show an example method of producing a mirror structure 700 for a DMD in accordance with various examples herein. The components in structure 700 are not shown to scale. In FIG. 7A, structure 700A is formed using the technique described above with respect to FIGS. 1A-1D and therefore has a flat top surface. In FIGS. 7A-7I, some steps may be omitted for simplicity, such as cleaning steps, etching steps, patterning steps, etc.

Structure 700A includes a metal layer 702, metal layer 704, and ARC Ox layer 706. Metal layers 702 and 704 may include metals, metal alloys, a substrate, or a components of an ARC film stack. These layers have been deposited, patterned, and etched to form the structure shown here. In some examples, metal layers may include titanium oxide, titanium nitride, and/or aluminum. Metal layer 702 may be a CMOS substrate, which may sit on a substrate of intermetal dielectric (IMD) oxide (not shown in FIG. 7A). Metal layer 702 may be built on top of a multi-layer transistor layout that includes traditional semiconductor source/drains, polysilicon gates, contacts, poly-metal dielectric, and multiple levels of interconnect metal isolated with inter-metallic dielectrics (not shown in FIG. 7A). This transistor layout provides signals for controlling the operation of the DMD.

Structure 700A also includes spacer material 708 and spacer material 710. Spacer material 708 may be any suitable sacrificial material that is removed during a later processing step to release the MEMS device. Spacer material 708 may be patterned and/or etched to produce the shape shown in FIG. 7A. Spacer material 708 may be a photoresist or carbon rich film in some examples. The material for structural hinge metal 712 may be deposited on portions of spacer material 708.

Spacer material 710 may be a non-photoactive organic polymer, such as an SOC as described herein. Spacer material 710 may be a methacrylate polymer in some examples. Spacer material 710 may be deposited on spacer material 708 and the other materials as shown. In some examples, spacer material 710 may be deposited in two layers to create a flatter top surface as described herein. As shown in FIG. 7A, spacer material 710 has a flat top surface, and a metal for a mirror is deposited on the flat top surface of spacer material 710 in later steps described below. The techniques described herein to create a flat top surface of a spacer material, such as spacer material 710, allow a flat mirror to be created.

Structure 700A also includes structure hinge metal 712, oxide 714, and BARC 716. These layers may be deposited, patterned, and/or etched using any suitable techniques to create the structures shown here. After structure 700A is created as shown, the process moves to FIG. 7B.

Figure 7B:
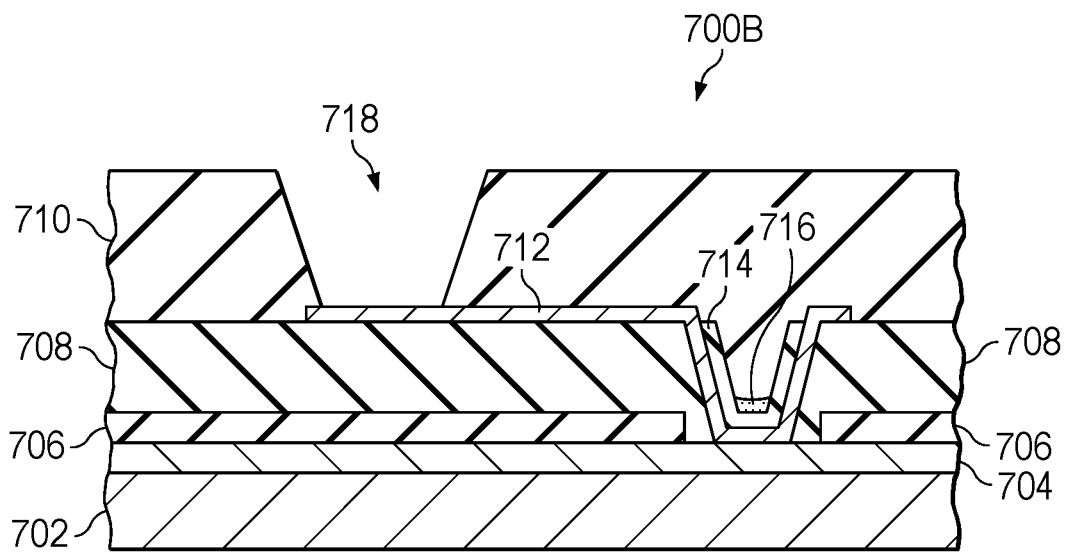

FIG. 7B shows a structure 700B in accordance with various examples herein. In structure 700B, spacer material 710 has been patterned and etched to create a mirror via 718. Any suitable resist or other material may be used for patterning and etching spacer material 710 to create the mirror via 718.

Figure 7C:
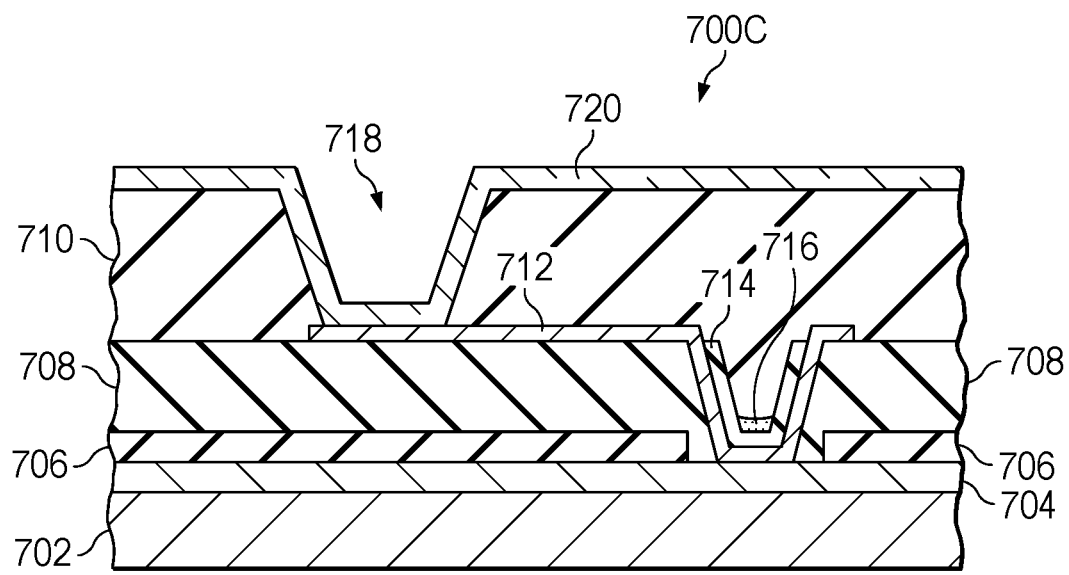

FIG. 7C shows a structure 700C in accordance with various examples herein. In structure 700C, a first mirror layer 720 is deposited on spacer material 710. First mirror layer 720 may be aluminum in some examples, or any other suitable material in other examples. Because the top surface of spacer material 710 is flat in accordance with the techniques and materials described herein, first mirror layer 720 is also flat, which will help to produce a flatter final mirror compared to other techniques.

Figure 7D:
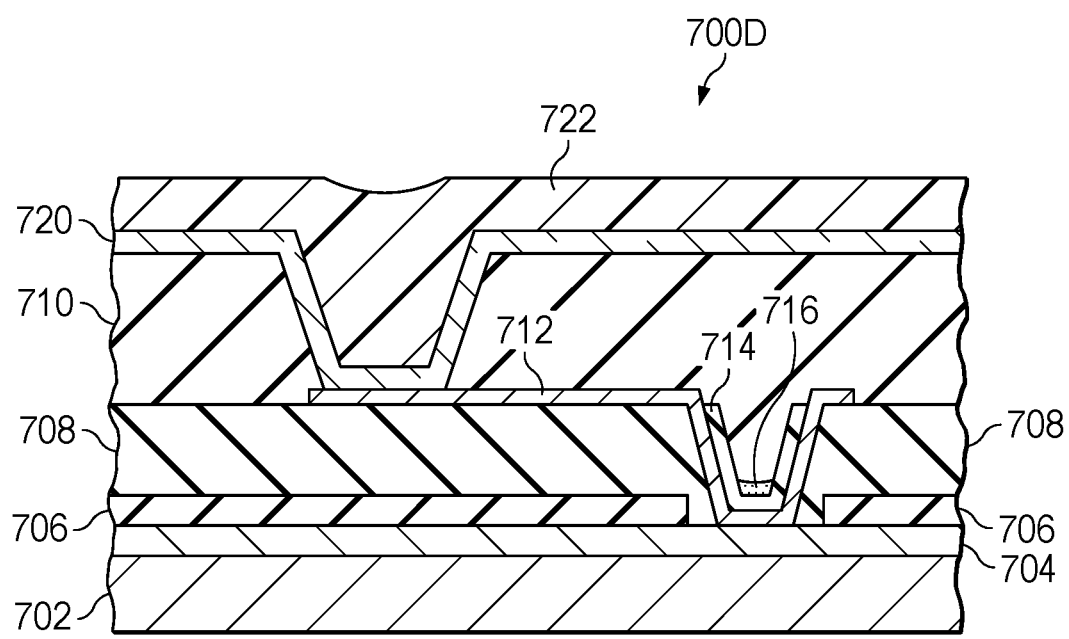

FIG. 7D shows a structure 700D in accordance with various examples herein. In structure 700D, mirror via 718 is filled with filler 722. Filler 722 may be any suitable gap-filling material. In some examples, filler 722 may have a small divot at its top surface above the filled mirror via.

Figure 7E:
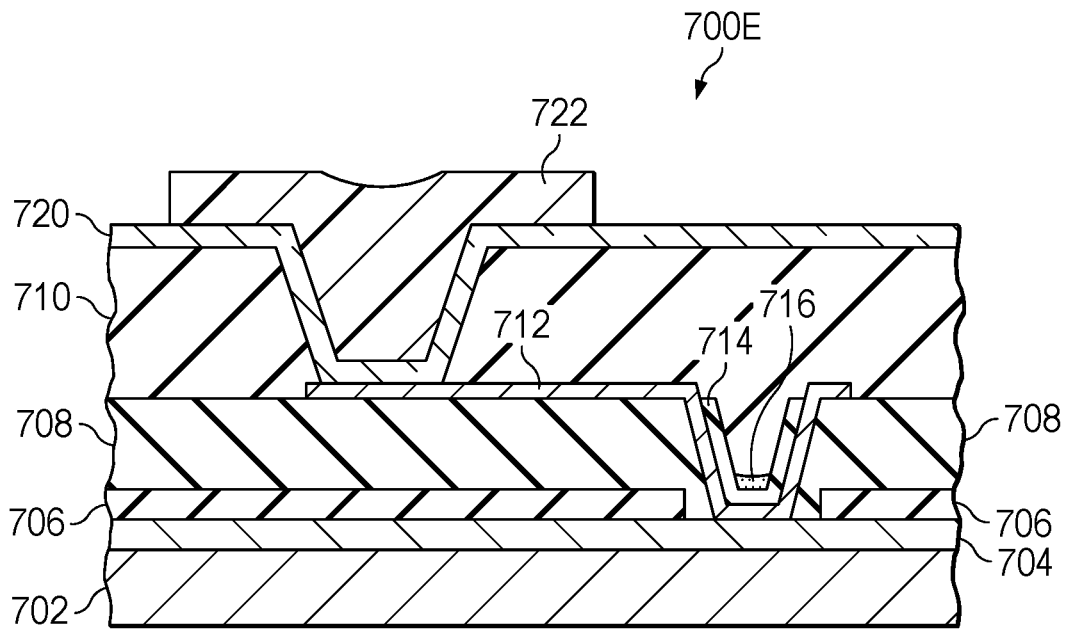

FIG. 7E shows a structure 700E in accordance with various examples herein. In structure 700E, filler 722 has been patterned and etched to remove filler 722 from first mirror layer 720, except over the mirror via 718, which is now a filled mirror via. Any suitable ashing, etching, cleaning, or other processes may be used to create structure 700E.

Figure 7F:
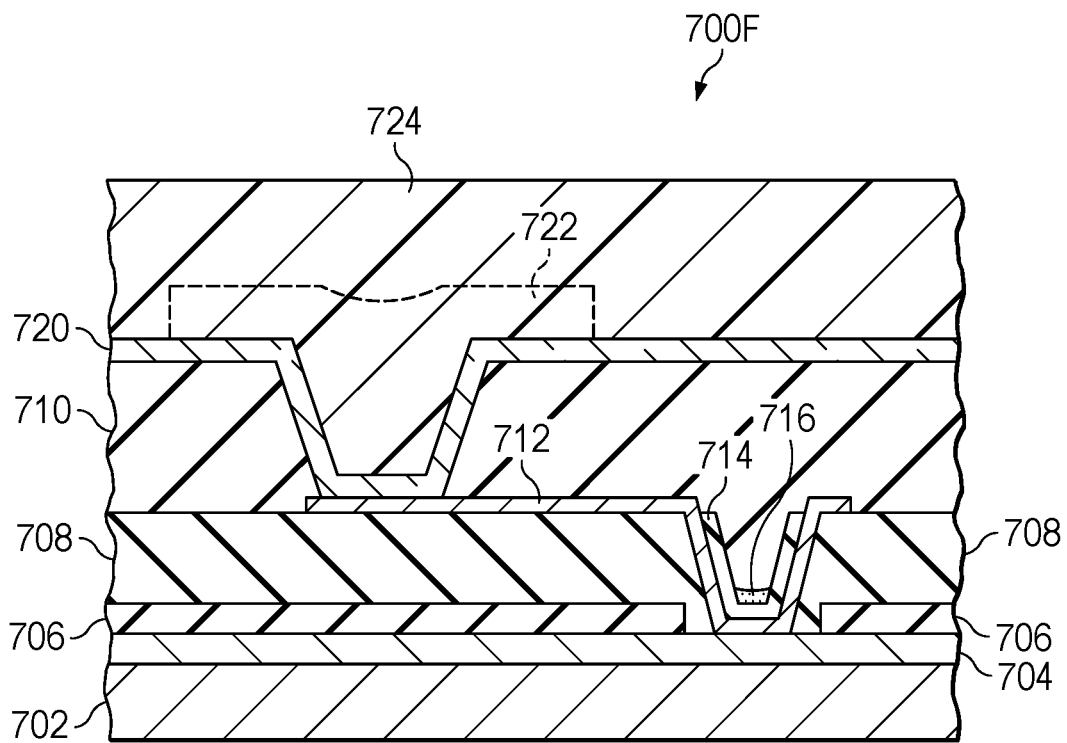

FIG. 7F shows a structure 700F in accordance with various examples herein. In structure 700F, a second layer of filler material is deposited, shown as filler 724. Filler 724 may be the same material as filler 722. By using two layers, a flatter surface may be created as described herein. A dashed line in structure 700F shows the boundary between filler 722 and filler 724. By using two layers, removal of fillers 722 and 724 in later steps may create a flatter top surface without the divot shown in filler 722 in FIGS. 7D and 7E.

Figure 7G:
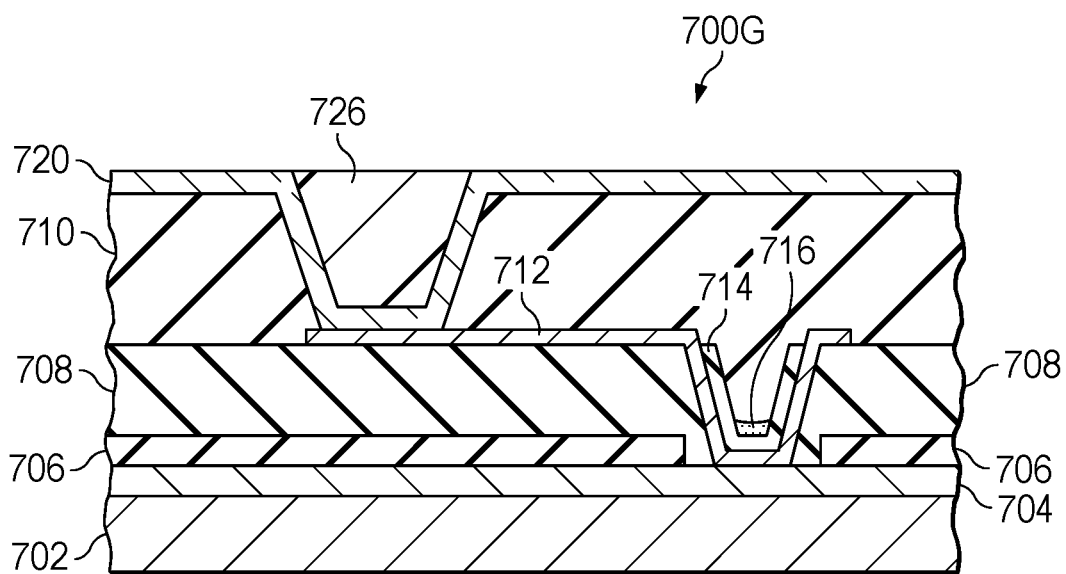

FIG. 7G shows a structure 700G in accordance with various examples herein. In structure 700G, fillers 722 and 724 are etched to flatten the top surface of the mirror via 718, which is now shown as filled via 726. Any suitable etching process may be used. Filled via 726 has a flat top surface due to fillers 722 and 724 etching at similar rates. This flat top surface of filled via 726 will allow other layers deposited on filled via 726 to be flat, such as another mirror layer as described below.

Figure 7H:
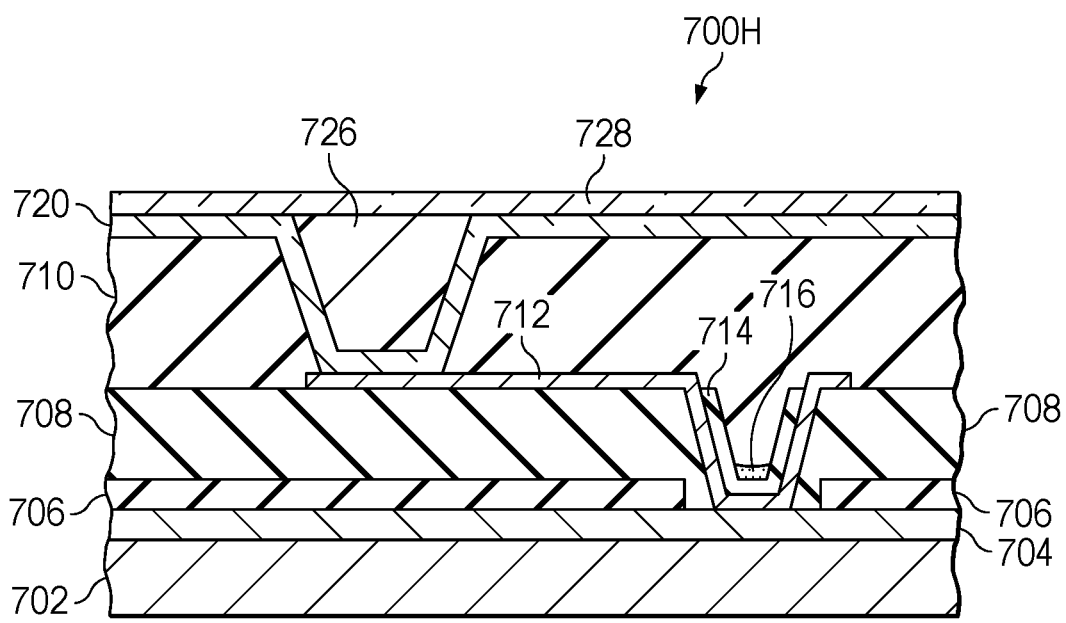

FIG. 7H shows a structure 700H in accordance with various examples herein. In structure 700H, a second mirror layer 728 is deposited on first mirror layer 720 and filled via 726. In accordance with the techniques described herein, first mirror layer 720 and filled via 726 have flatter top surfaces than other techniques. Therefore, second mirror layer 728 is also a flatter surface than found in other techniques.

Figure 7I:
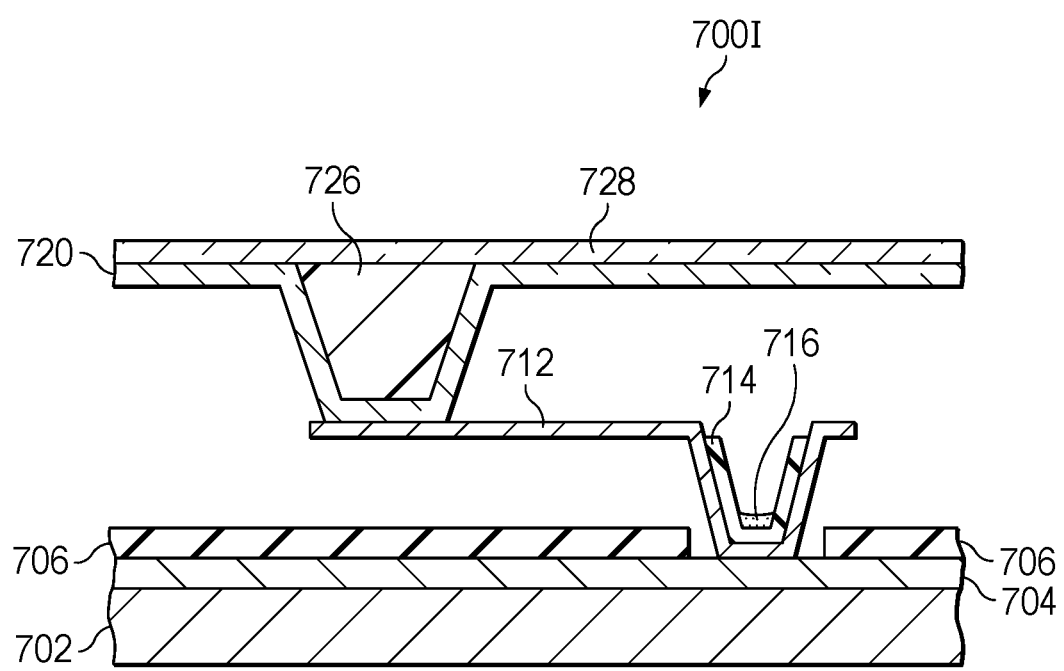

FIG. 7I shows a structure 700I in accordance with various examples herein. In structure 700I, spacer materials 708 and 710 have been removed to release the MEMS device, in this case a mirror and hinge for a DMD. Spacer materials 708 and 710 may be removed using any suitable ashing or etching process. In some examples, other steps may be performed before removing spacer materials 708 and 710. These steps are omitted here for simplicity, but may includes steps such as patterning the mirror to define the mirror edges, adding an ARC layer, cleaning the mirror or other surfaces, etc. Structure 700I shows that flatter surfaces may be created for MEMS devices such as DMDs.

In examples herein, processing techniques are described that produce flatter, more uniform surfaces. A gap-filling substance is deposited and baked in two layers. Because the same gap-filling substance is used for both the first and the second layers, the gap-filling substance etches uniformly and creates a flatter top surface. With the flatter top surface, structures created on top of the gap-filling surface, such as a mirror of a PLM, may be made flatter. In some examples herein, the gap-filling substance is a non-photoactive organic polymer.

The processes described herein are useful or creating any type of MEMS device, including spatial light modulators, accelerometers, microphones, micro-barometers, or microsensors. The processes described herein create flatter surfaces for MEMS devices compared to using photoresist for a gap-filling substance. Therefore, any MEMS device with gap-filling substances that are removed to release the MEMS device may employ the techniques herein to produce flatter surfaces. As an example, an accelerometer may be constructed with gap-filling substances that are removed to release the accelerometer. The examples herein may be used for creating both contact MEMS devices and non-contact MEMS devices.

The term "couple" is used throughout the specification. The term may cover mechanical connections, electrical connections, communications, or signal paths that enable a functional relationship consistent with this description.

Unless otherwise stated, "about," "approximately," or "substantially" preceding a value means +/−10 percent of the stated value. Modifications are possible in the described examples, and other examples are possible within the scope of the claims.

What is claimed is:

1. A method of manufacturing a microelectromechanical (MEMS) device, the method comprising:
    forming a via;
    depositing metal in the via;
    depositing a first layer of an organic polymer on the metal;
    baking the first layer of the organic polymer;
    depositing a second layer of the organic polymer on the first layer of the organic polymer after baking the first layer of the organic polymer;
    baking the second layer of the organic polymer; and
    etching the first layer and the second layer of the organic polymer.

2. The method of claim 1, wherein the organic polymer is a spin-on carbon.

3. The method of claim 1, wherein the organic polymer is a methacrylate polymer.

4. The method of claim 1, wherein etching the organic polymer includes performing a plasma etch.

5. The method of claim 1, further comprising:
    depositing a spacer material on the second layer of the organic polymer;
    creating one or more mirror vias in the spacer material; and
    depositing a mirror material on the spacer material.

6. The method of claim 5, further comprising:
removing the spacer material, the first layer of the organic polymer, and the second layer of the organic polymer to release the MEMS device.

7. The method of claim 1, wherein the second layer of the organic polymer has a thickness between 1,000 and 10,000 Angstroms.

8. The method of claim 1, wherein the second layer of the organic polymer is baked between 175 and 185 degrees Celsius.

9. The method of claim 1, wherein etching the organic polymer includes exposing a portion of the metal in the via.

10. The method of claim 1, wherein the metal in the via forms a hinge for the MEMS device.

11. The method of claim 1, wherein the metal has a thickness between 100 and 1,000 Angstroms.

12. A method, comprising:
depositing a spacer material over a substrate;
patterning the spacer material to form patterned spacer material;
depositing a metal layer over the patterned spacer material;
depositing an oxide film over the metal layer;
etching a portion of the oxide film, wherein the oxide film remains at a sidewall and a bottom of the patterned spacer material;
patterning the metal layer with a pattern;
etching the pattern into the metal layer;
depositing a first layer of an organic polymer over the metal layer;
baking the first layer of the organic polymer;
depositing a second layer of the organic polymer over the first layer of the organic polymer;
baking the second layer of the organic polymer; and
etching the organic polymer.

13. The method of claim 12, wherein the organic polymer is a spin-on carbon.

14. The method of claim 12, wherein the second layer of the organic polymer has a thickness between 1,000 and 10,000 Angstroms.

15. The method of claim 12, wherein patterning the spacer material includes creating a via in the spacer material.

16. The method of claim 15, wherein the via is between 0.3 and 6.0 micrometers deep.

17. The method of claim 12, wherein the metal layer is a hinge metal for a spatial light modulator.

18. The method of claim 12, wherein the metal layer is between 100 and 1000 Angstroms thick.

19. The method of claim 12, wherein the oxide film is between 1000 and 10,000 Angstroms thick.

20. A method for manufacturing a phase light modulator, the method comprising:
forming a via for a hinge of the phase light modulator (PLM);
depositing metal in the via to form the hinge;
depositing a first layer of an organic polymer over the hinge;
baking the first layer of the organic polymer;
depositing a second layer of the organic polymer on the first layer of the organic polymer after baking the first layer of the organic polymer;
baking the second layer of the organic polymer; and
etching the first layer and the second layer of the organic polymer to reveal a portion of the hinge of the PLM.

* * * * *